United States Patent Office 3,634,533
Patented Jan. 11, 1972

3,634,533
METHOD FOR DEHYDRATING MOISTURE-CONTAINING MATERIALS USING CARBON MONOXIDE AND A CRYSTALLINE ALUMINOSILICATE CATALYST
Vincent J. Frilette, Morrisville, Pa., assignor to Mobil Oil Corporation
No Drawing. Continuation-in-part of application Ser. No. 307,785, Sept. 10, 1963. This application Aug. 29, 1969, Ser. No. 854,251
Int. Cl. C07c 7/00; C07b 5/00
U.S. Cl. 260—674                             3 Claims

ABSTRACT OF THE DISCLOSURE

This invention relates to a method for dehydrating a moisture-containing material by contacting the same with carbon monoxide in the presence of a crystalline aluminosilicate catalyst under conditions such that the water in such material is removed by catalytic reaction with said carbon monoxide to yield carbon dioxide and hydrogen. In one embodiment the invention resides in a method for drying a wet crystalline aluminosilicate catalyst by contacting the same with carbon monoxide under conditions of time and temperature such that the water in the crystalline aluminosilicate catalyst reacts with the carbon monoxide to yield carbon dioxide and hydrogen.

CROSS-REFERENCES TO RELATED APPLICATIONS

This application is a continuation-in-part of Ser. No. 307,785, filed Sept. 10, 1963 and issued as U.S. Pat. 3,479,149.

BACKGROUND OF THE INVENTION (1) This invention relates to an improved method for drying materials by bringing the same into contact with carbon monoxide in the presence of a crystalline aluminosilicate catalyst under conditions such that the carbon monoxide reacts with water to yield carbon dioxide and hydrogen. The latter gases are removed from the material undergoing dehydration to yield a resulting dried product.

(2) Description of prior art.—It has heretofore been known to dry various materials by merely exposing the same to the atmosphere, which method has the disadvantage of often requiring an extremely long time. It has also been known to hasten the drying process by the application of heat, which serves to drive off the moisture from the material undergoing dehydration. It has also been known to employ various desiccating agents, such as calcium chloride and the like, to adsorb moisture from a large variety of moisture-containing materials. The latter processes have had the disadvantage of requiring either subsequent separation and/or disposal of the wet calcium chloride or other adsorbent material employed. The application of heat has in many instances been undesirable in the drying of heat-sensitive materials. Thus it has been found that in employing such method, not only is the moisture removed from the material, but the resulting product is often in a partially decomposed or degraded state attributable to heat damage as a result of the drying operation.

SUMMARY OF THE INVENTION

In accordance with the present inevntion, it has now been found that moisture-containing materials may be dried by contacting the same with carbon monoxide in the presence of a crystalline aluminosilicate under conditions of time and temperature such that the water in said material is removed by catalytic reaction with the carbon monoxide, yielding carbon dioxide and hydrogen. The method of the invention affords an improved procedure for drying or eliminating water from various organic or inorganic materials. The latter may include aluminosilicate materials known in the art as molecular sieves. In such instance, a wet molecular sieve is contacted with carbon monoxide at an elevated temperature below that at which crystallization of the molecular sieve is adversely affected and withdrawing carbon dioxide and hydrogen until no additional carbon dioxide is formed.

The method of the invention fulfills the need of the art in providing a procedure whereby normally heat sensitive materials may be dehydrated by contacting with carbon monoxide in the presence of a catalyst comprising a crystalline aluminosilicate of highly ordered internal structure.

DESCRIPTION OF THE SPECIFIC EMBODIMENTS

The crystalline aluminosilicate catalysts utilized in the method of this invention primarily differ from conventional catalysts in that they have a high degree of crystallinity or ordered internal structure, uniform pore size, high activity, and resistance to catalytic poisons, particularly sulfur compounds.

Generally the catalysts with which this invention is concerned, is crystalline metal aluminosilicates. These materials are possessed of very high surface area per gram and are microporous. The ordered crystalline structure gives rise to a distinct pore size, related to the structural nature of the ordered internal structure. Several synthetic forms are commercially available, as well as many natural crystalline aluminosilicates.

The composition of the zeolitic structures contemplated by this invention includes exchangeable metal ions, silicon, aluminum and oxygen arranged in a definite and consistent crystalline pattern. Such structure contains a large number of small cavities, interconnected by a number of still smaller channels. These cavities and channels are precisely uniform in size. Chemically these zeolites may be represented by the general formula:

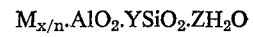

$$M_{x/n} \cdot AlO_2 \cdot YSiO_2 \cdot ZH_2O$$

where M is a metal cation and $x/n$ is the number of exchangeable metal cations of valence $n$, and $x$ is also the number of aluminum ions combined in the form of aluminate, Y is the number of silicon atoms and Z is the number of water molecules, removal of which produces the characteristic channel system common to this class of crystalline materials.

Various exchangeable cations and mixtures thereof may be introduced by base-exchange techniques well known in the art. In any event, the exchanged zeolite should be stable on dehydration and give the X-ray diffraction pattern characteristic of the crystalline aluminosilicate employed.

Electropositive metal ions are generally preferred for this base-exchange process, especially the alkali metal cations. However, many other metal ions either alone, in combination with one another or in combination with alkali metal cations may be used. These cations may be subdivided into those which are difficultly reducible and those which are easily reducible; in the first category would be those having standard electrode potential greater than +0.50 volt, and in the second category, those with less than 0.50 volt. The elements Li, Rb, K, Sr, Ba, Ca, Na, Mg, Cr, Ga, fall into the first category, whereas Fe, Co, Cd, Ni, Cu, Ag, Pd, fall into the second category.

In some instances, catalytic advantages can be realized by contacting aluminosilicate salts which contain difficultly reducible cations with solutions containing one or more easily reducible cations to deposit limited quantities of the latter within the intracrystalline pores of the aluminosilicate.

Additionally, the total cations exclusive of hydrogen within the crystalline aluminosilicate may vary from 0.5 milliequivalent to 15 milliequivalents per gram of crystalline aluminosilicate salt in the preferred catalyst.

One natural material of particularly high activity is mordenite. Mordenite is a crystalline material occurring naturally as the hydrated salt corresponding to:

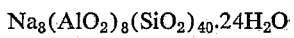
$$Na_8(AlO_2)_8(SiO_2)_{40} \cdot 24H_2O$$

This mordenite material may be leached with dilute hydrochloric acid to arrive at an H or acid form. In a specific example, the mordenite material may be so treated as to have more than 50% in the acid form.

Another suitable catalyst is synthetic faujasite, also known as 13X molecular sieve, described in U.S. Pat. No. 2,882,244. This molecular sieve is an excellent catalyst in the sodium form; optionally it may be base exchanged with a solution of rare-earth chlorides (containing 4% of rare earth trichloride hexahydrates) at 180–200° F. to remove sodium ions from the aluminosilicate complex and replace at least some of them with the chemical equivalent of rare-earth ions for certain embodiments of this invention. After washing free of soluble material and drying, there is produced a rare-earth exchanged X-type aluminosilicate containing 1.0–1.5% (wt.) of sodium and about 25% (wt.) of rare-earth ions calculated as trivalent rare earth oxides.

A 5A material indicates a synthetic crystalline aluminosilicate of A structure in the calcium form that has a pore size of about 5 A. diameter. Another commercially available crystalline aluminosilicate is synthetic faujasite, sometimes designated the X structure and having 10–13 A. pore diameter. A more siliceous variety of faujasite, also known as the Y structure, may be synthesized. Another commercially available crystalline aluminosilicate is a synthetic mordenite known as "Zeolon." The salts of these materials may be interconverted, and some may be converted to the "H" or acid form, wherein a hydrogen occupies the cation sites. For example, such a conversion may be had by ion-exchange with an ammonium ion, followed by heating to drive off $NH_3$ or by controlled acid leaching. In general, the crystal is more stable in materials having higher Si/Al atom ratios, such as 1.25/1 and above.

A wide variety of natural and synthetic crystalline aluminosilicates may be used as catalysts, in many instances with little or no preparation other than transformation into a suitable physical form. Such transformations include grinding or pulverizing, sieving, compacting with or without added agents, and pelletizing. Natural mordenite in the form of beach pebbles is best transformed by grinding to a fine powder followed by recompaction to make accessible the multitude of channels for entry and egress of reactants and products. This illustration, given by way of example, is non-limiting. Those skilled in the art will readily recognize the desirable physical transformations that may suggest themselves, depending on the nature of the raw material and the specific embodiment of this invention which it is desired to practice, for the large number of natural crystalline aluminosilicates such as chabazite, gmelinite, mordenite, dachiardite, erionite, paulingite, ptiolite, etc., that may be used. These remarks apply equally well to synthesized crystalline aluminosilicates. In some instances, more desirable results will be obtained by base-exchanging the crystalline aluminosilicate prior to, during, or subsequent to, the indicated physical transformation.

According to the invention, the aluminosilicate may be composited with relatively inactive matrix material. The amount of active component in the composite may be varied within wide limits and may also vary as to the nature of the aluminosilicate employed, the cation character and concentration, and the nature of added components incorporated by precipitation in the pores thereof.

Particularly important variables in aluminosilicate structure are selection of cations, the silicon to aluminum atom ratio, pore diameter, and spatial arrangement of cations. The cations may be protons (acid) derived by base exchange with solutions of acids or ammonium salts, the ammonium ion decomposing on heating to leave a proton. Preferably, the cations are cations derived from electropositive metals which form strong bases in aqueous solution. Especially preferred are the alkali metal cations such as lithium, sodium, potassium, rubidium and caesium. The crystalline aluminosilicates also should possess pore openings of at least about 3 A. as evidenced by ability to sorb substantial quantities of water after evacuation at elevated temperature.

In general, the method of the invention comprises contacting the moisture-containing material in the presence of a crystalline aluminosilicate catalyst and in the presence of carbon monoxide, present in sufficient quantity to catalytically react with the moisture contained in the material undergoing dehydration in accordance with the equation: $CO + H_2O \rightleftharpoons CO_2 + H_2$. The temperatures at which such reaction may be conducted vary widely. They are, however, determined to some extent by the equilibrium laws which apply to the basic reaction shown above. These equilibrium laws are well recognized and should be considered in any specific embodiment of this invention. In general, the reaction in which carbon monoxide is converted to hydrogen is favored by lower temperatures and may be effectively carried out at temperatures ranging from 300° F. to 1400° F. Above this temperature the equilibrium limitations begin to seriously hamper the formation of hydrogen. For this conversion, 1 mol of CO is diluted with 1 to 100 mols of steam. This reaction may be conducted over a wide range of pressures, ranging from a subatmospheric partial pressure of carbon monoxide to 500 atmospheres.

It should also be noted that the upper temperature limit of the method of this invention is that point at which the catalyst loses its ordered internal structure, whereas the lower temperature limit is that where no reaction takes place after the reactants have been exposed to the catalyst for a reasonable length of time.

The following examples will serve to illustrate the method of the invention without limiting the same:

EXAMPLE 1

Benzene, containing 0.1 wt. percent water, was passed continuously over a bed of dry 4A crystalline aluminosilicate to reduce the water content to less than 50 p.p.m. After the drying capacity of the bed was exhausted, the benzene stream was stopped and the temperature raised to 800° F. while simultaneously a stream of CO was flowed through the bed and any $CO_2$ and $H_2$ formed was removed. When the $CO_2$ formation substantially ceased, the temperature was again lowered and the benzene drying operation was reinstituted, completing the cycle.

The following example illustrates the catalytic chemical drying of benzene.

EXAMPLE 2

Benzene vapor containing 0.1 wt. percent water was mixed with CO and the mixture passed in vapor phase over a bed of sodium mordenite at 650° F. After passage through the bed, the vapors were cooled to separate the dried benzene, unconsumed $CO$, $CO_2$ and $H_2$. The recovered gas may be recycled after removal of the $CO_2$ by conventional means.

It is obvious that other gases, inorganic vapors and organic vapors can be dried by this process, for example, N, He, Ne, A, Kr, Xn, and Rn. These are not intended to be exhaustive of the gases which can be so treated but rather are non-limiting examples.

Although specific crystalline aluminosilicates and particular reaction conditions have been given in the above examples, other crystalline aluminosilicate catalysts are also contemplated. As specific examples, we may mention Zeolite A, Zeolite X, natural mordenite, synthetic mordenite known as "Zeolon," Zeolite T, and various rare earth ion-exchanged crystalline aluminosilicates. The crystalline aluminosilicates need not be entirely in the salt form, so long as substantial mobile cation other than hydrogen is present. In general, better catalyst stability will be achieved by the use of aluminosilicates which do not degrade too readily in the presence of steam. In general, the steam stability of aluminosilicates in a homologous series such as the faujasite series, which includes Zeolites "X," "Y," and faujasite, is improved as the silica to alumina ratio is increased. In a preferred embodiment of this invention, the crystalline aluminosilicate has a silicon to aluminum atomic ratio of at least 1.25 and preferably greater than 1.75.

Other zeolite catalyst compositions are contemplated and are to be considered within the broad scope of this invention. The following compositions should also be considered as part of the invention:

(a) Zeolite A is a synthetic, commercially produced material. Like all zeolites, it can exist in a variety of ion-exchange forms. The effective intra-crystalline channel diameter as well as the catalytic efficiency of this zeolite depends upon the ion in the exchange sites, for example:

(1) The potassium form (3A Molecular Sieve) has an effective channel diameter of 3 A.,
(2) The sodium form (4A Molecular Sieve) has an effective channel diameter of 4 A.,
(3) The calcium form (5A Molecular Sieve) has an effective channel diameter of 5 A.

(b) Zeolite ZK–4 is a synthetic material whose crystal structure is similar to zeolite A. Tetramethylammonium hydroxide is used in the synthesis. Zeolite ZK–4 contains more silica and less alumina and exchangeable cations than does zeolite A. This difference in composition is reflected in the increased stability of the hydrogen form of ZK–4 relative to the A form. The effective channel diameter of the sodium form of zeolite ZK–4 is 5 A.

(c) Zeolite α is a very highly siliceous form of zeolites A and ZK–4. Unlike zeolites A and ZK–4, this zeolite is stable when all the exchangeable cations are hydrogen.

(d) Zeolite X is a synthetic faujasite produced commercially, and it has the same crystal structure as naturally-occurring faujasite. This zeolite in the sodium form is called 13X Molecular Sieve. In the calcium form it is called 10X Molecular Sieve. Unlike most zeolites, it can sorb molecules with molecular diameters up to about 10 A. Such molecules would include branched chain hydrocarbons, cyclic hydrocarbons and even certain alkylated cyclic hydrocarbons.

(e) Zeolite Y is a group of materials possessing the same crystal structure as zeolite X. Zeolites of the Y group contain more silica and less alumina than zeolite X. In accordance with the general behavior of zeolites, as the silica content is increased, the crystal structure becomes more stable to heat, steam and hydrogen ions. Unlike zeolite X, the crystal lattices of the more silica-rich members are stable when all of the exchangeable cations are hydrogen.

(f) Mordenite is a naturally occurring zeolite originally synthesized by R. M. Barrer. Synthetic mordenite is available commercially under the name Zeolon. Mordenite, synthetic and natural, is very rich in silica and is unusually steam stable and stable to hydrogen ion and acids. It is a very active hydrocarbon conversion catalyst in the hydrogen form. It can sorb simple cyclic hydrocarbons but cannot sorb large molecules as do zeolites X and Y. It readily sorbs $CO$, $CO_2$, $H_2O$ and $H_2$.

(g) Zeolite ZK–5 is a synthetic zeolite. Triethylenediamine is used in its synthesis. It sorbs straight chain hydrocarbons but excludes branched chain and cyclic hydrocarbons. This zeolite has the same silica content as the more silica-rich zeolites of the Y group and thus is stable when all of the exchangeable cations are hydrogen.

Some of the natural zeolites useful in accordance with the invention include: analcite, paulingite, ptilolite, clinoptilolite, ferrierite, chabazite, gmelinite, levynite, erionite, and faujasite.

Other synthetic crystalline aluminosilicates useful in the invention include: Zeolite E, Zeolite F, Zeolite G, Zeolite K–G, Zeolite H, Zeolite J, Zeolite L, Zeolite M, Zeolite K–M, Zeolite Q, Zeolite R, Zeolite S, Zeolite T, Zeolite U, and Zeolite Z.

Certain feldspathoids are also useful in the invention. Feldspathoids are crystalline aluminosilicates which contain intercalated (or occluded) salts and bases. These intercalated materials usually "stuff" the crystal structure, thus precluding absorption of vaporous materials. Some naturally-occurring feldspathoids include: leucite, kalsilite, kaliophilite, nepheline, sodalite, noselite, houynite, lazurite, and cancrinite.

The specific examples given above refer to processes which are continuous in nature. However, the reaction may be conducted in a batch method by either using a closed reaction vessel or by introducing the reactants into apparatus analogous to that previously described and sealing off both ends of the tube. Regardless of method of operation, a contact time of from 0.01 to 1000 seconds, and preferably from 1 to 100 seconds, per volume of gas equal to the apparent volume (i.e. bulk volume) of catalyst is required for the process of this invention. The longer the contact time, in general, the greater will be the extent of attainment of equilibrium.

The method of this invention has the advantage of affording a more accelerated removal of water from the material undergoing drying than that achieved by the application of heat alone at a comparable temperature. In other words it is possible, utilizing the method of this invention, to achieve a lower water level at a comparable temperature by contacting the material undergoing dehydration with carbon monoxide under suitable conditions of temperature and pressure, than is realized by the application of heat alone. In effecting drying of the moisture-containing materials in accordance with the method of this invention utilizing a crystalline aluminosilicate catalyst, the material undergoing dehydration may or may not enter the pores of the particular crystalline aluminosilicate employed. Thus in the drying of a wet organic material, such as for example, benzene, the latter will enter the pores of the crystalline aluminosilicate which are large enough to accommodate the benzene molecule, for example, crystalline aluminosilicates of the faujasite type such as Zeolite X or Zeolite Y. On the other hand, the use of a smaller pore size crystalline aluminosilicate, such as for example, Zeolite A, does not permit benzene to enter the internal structure of the aluminosilicate. Nevertheless, such materials may be effectively dried upon contact with carbon monoxide under the conditions described hereinabove. It is in fact generally preferred that the material undergoing dehydration is of such molecular configuration that it does not enter the pores of the crystalline aluminosilicate catalyst employed.

It will be apparent to those skilled in the art that various modifications may be made in the disclosed methods without departing from the scope of the invention as defined in the following claims.

What is claimed is:

1. A method for dehydrating a heat-stable moisture-containing gaseous material which comprises adding thereto carbon monoxide in sufficient quantity to react with the moisture contained in said material and contacting the resulting mixture with a crystalline aluminosilicate catalyst under conditions such that the water in said material is removed by catalytic reaction with said carbon monoxide to yield carbon dioxide and hydrogen.

2. The method of claim 1 wherein the heat-stable wet gaseous compound is an organic compound.

3. The method of claim 2 wherein the compound is benzene.

References Cited

UNITED STATES PATENTS

| | | | |
|---|---|---|---|
| 1,889,672 | 11/1932 | Larson | 23—213 |
| 2,602,020 | 7/1952 | Christian et al. | 23—150 X |
| 3,033,778 | 5/1962 | Frilette | 208—120 |
| 3,177,152 | 4/1964 | Kearby | 252—455 |
| 3,181,928 | 5/1965 | Frilette et al. | 23—2 |

EDWARD J. MEROS, Primary Examiner

U.S. Cl. X.R.

23—2, 111, 150, 213; 252—455